United States Patent Office 3,848,071
Patented Nov. 12, 1974

3,848,071
PROCESS FOR REDUCING THE TOTAL SULFUR CONTENT OF CLAUS OFF-GASES
Willem Groenendaal, The Hague, Netherlands, assignor to Shell Oil Company, New York, N.Y.
No Drawing. Filed Mar. 9, 1972, Ser. No. 233,281
Claims priority, application Netherlands, Mar. 29, 1971, 7104155
Int. Cl. C01b 17/16
U.S. Cl. 423—574      10 Claims

ABSTRACT OF THE DISCLOSURE

An improved Claus off-gas treating process of the type where sulfur dioxide in the off-gas is catalytically reduced to hydrogen sulfide which is subsequently removed with an adsorbent or absorbent for hydrogen sulfide. The improvement comprises forming substantially all of the reducing gas required for the catalytic reduction of the off-gases in situ in the Claus process by adding hydrocarbon or carbon dioxide to the feedstream of the Claus process.

BACKGROUND OF THE INVENTION

The invention relates to an improved process for reducing the total sulfur content of Claus off-gases.

In a typical Claus process elemental sulfur is manufactured from hydrogen sulfide by partial oxidation of the hydrogen sulfide to sulfur dioxide with oxygen or an oxygen-containing gas such as air, followed by reaction of the sulfur dioxide formed with the remaining part of the hydrogen sulfide in the presence of a catalyst. This process is commonly used both at refineries and for working-up hydrogen sulfide recovered from natural gas. It is generally carried out in a plant comprising a combustion chamber followed by one or more catalyst beds having condensers arranged in between in which the reaction products are cooled and the separated liquid sulfur recovered. The various steps of the process can be represented by the following equations:

$$2H_2S + 3O_2 \rightarrow 2H_2O + 2SO_2 \quad (1)$$

$$4H_2S + 2SO_2 \rightleftharpoons 4H_2O + \frac{6S_x}{8} \quad (2)$$

while the total reaction is represented by equation (3):

$$6H_2S + 3O_2 \rightleftharpoons 6H_2O + \frac{6S_x}{8} \quad (3)$$

For temperatures below 500° C., $x$ in the above equation has a value of 8.

In actual practice, the yield of recovered elemental sulfur is not completely quantitative resulting in a certain quantity of unreacted hydrogen sulfide and sulfur dioxide remaining in the effluent gases from the Claus process. These gases are normally burned in an incinerator whereby the hydrogen sulfide is converted to sulfur dioxide which is subsequently discharged to the atmosphere through a stack. The quantity of sulfur recovered depends to a large extent on the total number of catalyst beds used in the Claus process. When three beds are used generally about 98% of the sulfur can be recovered.

Because of increasingly stringent limitations on sulfur emissions to the atmosphere, and to increase sulfur yields, a considerable amount of effort has been devoted recently to reducing the sulfur content of Claus plant off-gases. Among the more desirable processes developed for this purpose are those based on the catalytic reduction of the sulfur oxides contained in the off-gases to hydrogen sulfide which is subsequently removed with the use of a solid adsorbent or liquid absorbent for hydrogen sulfide. Generally, the reduction of the off-gases is effected by mixing the gases with a hydrogen and/or carbon monoxide-containing reducing gas in the presence of a metal catalyst at elevated temperatures, e.g., above 175° C. Since a reducing gas is a necessary requisite of such off-gas treating processes, it is evident that the commercial feasibility of utilizing these processes may in many cases be determined by the availability of a suitable reducing gas at an economical price. This consideration would be particularly significant in the case of a small or isolated Claus plant or even in a refinery if all the available hydrogen was committed to other operations. The present invention provides a means of treating Claus off-gases by the above-mentioned reduction-adsorption or absorption method without the need of an independent source of reducing gas.

THE INVENTION

It has now been found that by adding small amounts of hydrocarbon or carbon dioxide to the feed stream of a Claus process it is possible to form sufficient quantities of reducing gas in situ in the process to provide substantially all of the reducing gas required for catalytic reduction of the Claus off-gases, and that the addition of hydrocarbons to the feed does not adversely affect the quality of the sulfur product. This latter finding is particularly surprising since it is commonly accepted that the presence of hydrocarbons in Claus feed streams is deleterious to the process and therefore is to be avoided. Results of present investigations revealed that contrary to expectations, the addition of hydrocarbon to the feed of a Claus plant operating at normal conditions with minor adjustments in the air supply will result in the production of sufficient quantities of hydrogen and/or carbon monoxide-containing reducing gas to effect reduction without appreciable contamination of the sulfur product.

The instant invention is generally applicable to any process for reducing the total sulfur content of Claus off-gases wherein the sulfur oxides in the off-gases are catalytically reduced to $H_2S$ with a hydrogen and/or monoxide-containing gas in the presence of a metal catalyst and the hydrogen sulfide is subsequently removed with an adsorbent or absorbent. Generally reduction is accomplished in such processes at a temperature above 175° C., e.g., from 180° C. to 480° C. A very suitable catalyst employed in one such process is a Group VI and/or Group VIII metal catalyst supported on an inorganic oxidic carrier. The quantity of hydrogen and/or carbon monoxide-containing gas employed to effect reduction should be such that the molar ratio of the hydrogen and/or carbon monoxide reducing gas to the sulfur dioxide is from 3:1 to 15:1. In accordance with the present invention substantially all of this quantity of hydrogen and/or carbon monoxide is supplied in the Claus off-gas to be reduced.

In this specification Claus off-gases will be understood to mean the remaining gases in the state as obtained after the last catalytic bed of a Claus plant. Conventional Claus processes use two catalyst beds or in some cases three beds depending on the degree of sulfur removal desired. In addition to hydrogen sulfide and sulfur dioxide in a ratio of approximately 2:1, off-gases of this type also contain sulfur, water in the form of water vapor, carbon dioxide and slight quantities of carbon monoxide and hydrogen, as well as nitrogen and small quantities of inert gases if the Claus plant is operated with air. Depending on the manner in which the Claus process is operated and/or on the presence of hydrocarbons in the feed for the Claus process, the off-gases from the Claus plant may not only contain the above-mentioned compounds, but also carbonyl sulfide and/or carbon disulfide. The quantities of these compounds may vary from 0.1 to 0.4% by volume in the case of carbonyl sulfide from 0.05 to 0.3% by volume in the case of carbon disulfide.

According to the process of the present invention no or substantially no hydrogen- and/or carbon monoxide-containing gas need be supplied from elsewhere, since the hydrogen and the carbon monoxide required for the reduction is formed to a sufficient degree in the Claus process itself. This is an important advantage in view of the cost of the gases involved, and it also results in a simplification of the mode of operation of the process. Moreover, various hydrocarbons with fuel value may be advantageously used for this purpose.

Hydrocarbons which may be suitably incorporated into the Claus feed stream in accordance with the invention include single hydrocarbons such as benzene, heptane, hexane and the like. Mixtures of hydrocarbons for example such as are obtained during the processing of petroleum can also be advantageously used. Other compounds such as, for instance, thiophene or mercaptans, which may be expected to lead to the same results without disturbing side-effects can likewise be employed.

The introduction of liquid hydrocarbons into the Claus process is preferably effected by first evaporating them and then injecting the gasified hydrocarbons into the feed in order to guarantee correct dosing and ensure proper mixing. Gaseous hydrocarbons may, of course, be introduced direct.

The desirability of first vaporizing liquid hydrocarbons, and the fact that high-molecular hydrocarbons are more liable to cause soot formation than low-molecular hydrocarbons, make it advisable to use hydrocarbons which have boiling points below 220° C. Preference is given to light gasoline mixtures such as light naphtha with a final boiling point between 80° C. and 100° C. In principle, however, there is no objection to the use of heavier hydrocarbons, provided that the correct quantity of air is also added.

The quantity of hydrocarbon added will vary depending on the nature of the hydrocarbon employed and the amount of $SO_2$ and sulfur in the off-gas to be treated. For typical commercial Claus plants, a quantity of hydrocarbons (in the vapor phase or gaseous phase) of less than 10% by volume, based on the hydrogen sulfide in the feed stream will generally be sufficient. The results of laboratory tests showed that up to 6% by volume of benzene can be permitted in the Claus feed without adversely affecting the quality of the sulfur. It was also determined that the injection of 1-5% by volume of a mixture of pentane/hexane (50/50) in the main burner also has no appreciable effect on product quality.

The lower limit of hydrocarbon addition will be determined by the requirement that if no additional quantity of hydrogen and/or carbon monoxide from another source is added to the off-gas, the off-gas should contain so much hydrogen and carbon monoxide for the reduction that the ratio of hydrogen and carbon monoxide to sulfur dioxide is at least 3:1. If elemental sulfur is present in the off-gas, sufficient hydrogen should also be present for the reduction of the elemental sulfur to hydrogen sulfide as well.

Claus off-gases normally have a temperature of between 130° C. and 170° C. upon discharge from the last catalyst bed and corresponding condenser. For the reduction step over the preferred Group VI and/or Group VIII metal catalyst, the off-gases should, however, have a higher temperature and therefore are heated to a temperature above 175° C. The Claus off-gases are preferably brought to a temperature in the range of from 180° C. to 480° C. and more preferably between 200° C. and 350° C.

The increase in temperature to above 170° C. is also important in view of the presence of small quantities of elemental sulfur in the form of a mist in the off-gases. This objectionable sulfur mist disappears if the temperature is raised above the dew point of sulfur. A further result of raising the temperature to above 175° C., and preferably to above 180° C., is that the presence of the elemental sulfur in the gas phase has no adverse effect on the catalytic activity of the reduction catalyst.

As previously mentioned, Group VI and/or Group VIII catalysts are preferred for use in the instant process. Such catalysts include those containing molybdenum, tungsten and/or chromium as the Group VI metal, and/or preferably a metal from the iron group, such as cobalt, nickel and/or iron as the Group VIII metal.

Suitable reduction catalysts also include rhenium-containing catalysts, optionally combined with a Group VI and/or Group VIII metal. The rhenium may be present as a metallic element or in the form of an oxide or sulfide.

The inorganic oxidic carrier may be alumina, silica, magnesia, boria, thoria, zirconia or a mixture of two or more of these compounds. Particularly preferred reduction catalysts for use in the process according to the invention are $Ni/Mo/Al_2O_3$, and $Co/Mo/Al_2O_3$.

The Group VI and/or Group VIII metal catalyst is preferably used in the sulfided form. Sulfidation may be effected in advance by means of a suitable sulfiding agent such as a mixture of hydrogen and hydrogen sulfide containing 10-15% by volume of $H_2S$. However, it is also possible to sulfide the catalyst in situ by means of the Claus off-gases themselves.

The reduction preferably takes place at a temperature in the range of from 180° C. to 450° C., and more preferably between 200° C. and 350° C. Preferably, atmospheric pressure is used but slightly elevated pressures can also be employed if desired. The hourly space velocity applied during the reduction is 500 to 10,000 Nl of Claus off-gas per liter of catalyst per hour.

After or simultaneously with the reduction of sulfur oxides to hydrogen sulfide, the hydrogen and/or carbon monoxide-containing off-gases may, if desired, be further contacted with a solid catalyst for the conversion of carbonyl sulfide (COS) and/or carbon disulfide ($CS_2$) into hydrogen sulfide. The conversion of COS and $CS_2$ to $H_2S$ can be accomplished at temperatures of 250°–350° and at hourly space velocities of from 500 to 30,000 Nl per liter per hour. Solid catalysts suitable for this purpose include alumina, bauxite, activated clays, aluminum phosphate, thoria and magnesium chloride. For practical purposes the oxide-based catalysts are preferred. Most preferred are catalysts which consist of or contain alumina. The alumina may optionally be impregnated with a highly concentrated, aqueous alkali metal phosphate solution, for example with a solution containing 30% by weight or more of tripotassium phosphate and/or dipotassium orthophosphate.

The treated off-gases, which may or may not have been contacted with the solid catalyst, are subsequently contacted with an adsorbent or absorbent for the removal of hydrogen sulfide. Any conventional agents which chemically or physically bind the hydrogen sulfide can be used for this purpose. These agents may be subdivided into solid and liquid agents. If a liquid absorbent is employed, contacting is preferably effected at a temperature below 70° C. and the water present after condensation is first removed from the off-gases.

A very suitable solid adsorbent is active carbon, either as such or impregnated with solutions of chemical compounds which themselves are capable of reacting with hydrogen sulfide. Other suitable solid adsorbents are the oxides of certain metals, such as alumina, iron oxide and zinc oxide. More frequently use is made, however, of liquid absorbents. Well known absorbents of this type are aqueous solutions of alkanolamines, alkyl alkanolamines, morpholines, dimethyl formamide, amines, ammonia, alkali metal carbonates, combined or not combined with minor quantities of other compounds such as arsenic trioxide, selenic and/or telluric acid, potassium phosphate, sulfolane and the like. Use may also be made of solutions having an oxidizing nature, so that elemental sulfur is formed. These latter solutions generally consist of an absorbent for hydrogen sulfide containing a dissolved or suspended oxidant or catalyst. Suitable oxidants and/or catalysts are polythionates, iron oxide, thioaromatics, iron cyanide complexes, permanganates and dichromates.

The adsorbents/absorbents used are preferably regenerable. Any hydrogen sulfide-containing gas liberated during regeneration may be recycled, for example, to the Claus plant.

The liquid and regenerable absorbent used is preferably an aqueous solution (1–3 molar) of an amine or a substituted amine, such as polyalkanolamines or alkaline metal salts of dialkyl-substituted amino acids. A solution of dipropanolamine is very suitable.

If active carbon is used as adsorbent, adsorption is preferably effected between 20° C. and 150° C. and at hourly space velocities of 750–2,000 Nl gas per liter of active carbon per hour.

The off-gases which have been freed from sulfur compounds by the process of the invention and which now consist predominantly of carbon dioxide and nitrogen in addition to minor quantities of hydrogen and traces of hydrogen sulfide may be discharged into the atmosphere. If desired, these off-gases may first be incinerated in a conventional manner before being passed to a stack.

The invention will now be elucidated with reference to the following examples and comparative examples. The Claus plant used comprised a main burner and two line burners with associated catalyst beds.

A number of experiments were carried out in which in each experiment a larger quantity of a hydrocarbon, or of a mixture of two hydrocarbons or carbon dioxide, was introduced into the main burner and in which the air supply was adjusted acordingly. The maximum admissible quantity of hydrocarbon which could be added before any discoloration of the sulfur occurred was not only dependent on the nature of the added hydrocarbons, but also on the quantities of hydrogen sulfide passed through and air added. The off-gas mixture was analyzed before being introduced into a catalytic afterburner. The hydrogen sulfide feed which was used as starting material had a purity of 99% by volume of $H_2S$.

Comparative Sxample A

This comparative example shows that it is possible to reduce the sulfor dioxide present in the Claus off-gas over a suitable catalyst by means of hydrogen and carbon monoxide.

A synthetic Claus off-gas was reduced over a sulfided $Co/Mo/Al_2O_3$ catalyst (3.2 parts by weight Co/13.4 parts by weight Mo/100 parts by weight $Al_2O_3$), a mixture of hydrogen and carbon monoxide being used. The synthetic Claus off-gas, which had a varying sulfur dioxide content and contained approximately 0.1% by volume of carbonyl sulfide, was passed over the catalyst together with the reducing gas at an hourly space velocity of 1700 Nl of gas per liter of catalyst per hour. The composition of the total gas mixture was

| | |
|---|---|
| $SO_2$ | Varying. |
| $H_2$ | 0.5–0.6% by vol. |
| CO | 0.3–0.4% by vol. |
| $H_2S$ | 1.2% by vol. |
| COS | 0.1% by vol. |
| $N_2$ | Remainder. |

The catalyst was used in the form of particles having a particle size of 0.3–0.6 mm. (30–50 mesh).

Sulfidation of the catalyst took place at a maximum temperature of 375° C. and at a pressure of 10 kg./cm.$^2$ using an $H_2/H_2S$ gas mixture containing 12.5% by volume of hydrogen sulfide. The temperature was raised in stages over a 4-hour period from room temperature to 375° C. After sulfidization, the catalyst was cooled to 100° C. with an uninterrupted supply of the hydrogen sulfide-containing gas mixture. Subsequently, only hydrogen gas was passed oved and finally the reduction of the Claus off-gas was begun. The experiment was carried out at various reduction temperatures. The results obtained are shown in Table A.

TABLE A

| $SO_2$ content in gas mixture, percent by vol. (feed) | Reaction temperature, ° C. | Conversion in percent | | | $SO_2$ content after reduction, percent by vol. |
|---|---|---|---|---|---|
| | | $H_2$ | CO | $H_2+CO$ | |
| 0.17 | 222 | 34 | 65 | 45 | <0.001 |
| 0.17 | 250 | 27 | 100 | 50 | <0.001 |
| 0.36 | 250 | 63 | 100 | 80 | <0.03 |
| 0.36 | 280 | 89 | 100 | 94 | <0.001 |

Comparative Example B

This comparative example shows that elemental sulfur is also converted to hydrogen sulfide under the conditions employed.

A synthetic Claus off-gas which, in addition to sulfur dioxide and hydrogen sulfide, also contained a small quantity of carbonyl sulfide and gaseous elemental sulfur, was reduced with hydrogen at 220° C., using the same sulfided $Co/Mo/Al_2O_3$ catalyst as employed in Example I. The off-gas together with the hydrogen was passed over the catalyst at an hourly space velocity of 1400 Nl of gas per liter of catalyst per hour. The composition of the total gas mixture before and after reduction is shown in the Table below:

| Gas composition, percent by vol. | Before reduction | After reduction |
|---|---|---|
| $SO_2$ | 0.18 | 0.002 |
| $S_8$ | 0.018 | |
| $H_2$ | 1.5 | 0.8 |
| $H_2O$ | 29 | 30 |
| $H_2S$ | 1.3 | 1.7 |
| COS | 0.05 | 0.05 |
| $N_2$ | Remainder | Remainder |

Example I

Benzene was injected into the feed to the main burner of the Claus process, while the quantity of air was adjusted so that no soot formed and an optimum combustion hydrogen sulfide took place. The results obtained and the process conditions used are shown in Table B below.

TABLE B

| Run number | 1 | 2 | 3 | 4 |
|---|---|---|---|---|
| $H_2S$ feed, mol | 100 | 100 | 100 | 100 |
| Total air supplied, mol | 255 | 291 | 389 | 475 |
| Benzene injected, mol | | 0.84 | 3.2 | 5.3 |
| Benzene, percent by vol. based on $H_2S$ feed | | 0.84 | 3.2 | 5.3 |
| Total quantity of off-gas, mol | 317 | 355 | 462 | 556 |
| Analysis of off-gas mixture, percent by vol.: | | | | |
| $H_2S$ | 1.0 | 1.0 | 0.8 | 0.7 |
| $SO_2$ | 0.5 | 0.5 | 0.4 | 0.35 |
| S | 0.6 | 0.5 | 0.4 | 0.3 |
| $CO_2$ | 0.6 | 1.8 | 0.3 | 4.8 |
| $H_2+CO$ | 1.5 | 1.5 | 1.8 | 2.0 |

It is clear from the above data that an increase in the quantity of benzene added results in an increase of hydrogen and carbon monoxide in the off-gas mixture. Since it requires approximately three volumes of $H_2+CO$ to reduce one volume of $SO_2$ to $H_2S$, and one volume of $H_2+CO$ for each volume of sulfur, it is clear that there is sufficient reducing gas available in the off-gases in Run Nos. 3 and 4 to convert the total quantity of $SO_2$ and sulfur to $H_2S$, but an insufficient amount in Run Nos. 1 and 2.

Example II

A mixture of pentane and hexane (50/50) was injected into the feed to the main burner, while at the same time the air quantity was adjusted. The results obtained and the conditions used are shown in Table C.

TABLE C

| Run number | 5 | 6 |
|---|---|---|
| $H_2S$ feed, mol | 100 | 100 |
| Air supplied, mol | 304 | 427 |
| Pentane/hexane injected, mol | 1.05 | 4.2 |
| Pentane/hexane, percent by vol. based on $H_2S$ in feed | 1.05 | 4.2 |
| Total quantity of off-gas, mol | 369 | 508 |
| Analysis of off-gas mixture, percent by vol.: | | |
| $H_2S$ | 0.9 | 0.8 |
| $SO_2$ | 0.45 | 0.4 |
| S | 0.5 | 0.4 |
| $CO_2$ | 0.08 | 4.3 |
| $H_2 + CO$ | 1.5 | 2.0 |

Here again it is found that the concentration of hydrogen and carbon monoxide in the off-gas rises as the quantities of injected hydrocarbons increase.

In the case of Run 6, the ratio between the quantities of hydrogen plus carbon monoxide and sulfur dioxide after subtraction of the quantity for sulfur reduction is 4, which makes it possible in this case to reduce the remaining sulfur dioxide direct according to the method described hereinbefore.

Example III

Instead of hydrocarbon, carbon dioxide was added to the feed to the main burner at about the same quantity of supplied air. The results obtained and the conditions used are shown in Table D.

TABLE D

| Run number | 7 | 8 | 9 |
|---|---|---|---|
| $H_2S$ feed, mol | 100 | 100 | 100 |
| Air supplied, mol | 255 | 255 | 255 |
| Quantity of $CO_2$ added, mol | 1.1 | 5.3 | 15.8 |
| $CO_2$, percent by vol. based on $H_2S$ in feed | 1.1 | 5.3 | 15.8 |
| Total quantity of off-gas, mol | 317 | 320 | 330 |
| Analysis of off-gas mixture, percent by vol.: | | | |
| $H_2S$ | 1.0 | 1.0 | 1.0 |
| $SO_2$ | 0.5 | 0.5 | 0.5 |
| S | 0.6 | 0.6 | 0.6 |
| $CO_2$ | 0.9 | 2.1 | 4.9 |
| $CO + H_2$ | 1.5 | 1.6 | 1.9 |

It is clear from these experiments that the addition of carbon dioxide to the feed gas in itself brings about an increase in the hydrogen and carbon monoxide content of the off-gas.

I claim as my invention:

1. In a process for decreasing the total sulfur content of hydrogen sulfide and sulfur dioxide-containing off-gases from a Claus process wherein the Claus off-gases are passed with a hydrogen or carbon-monoxide-containing reducing gas over a metal catalyst whereby sulfur dioxide is reduced to hydrogen sulfide and the hydrogen sulfide is subsequently removed with the use of a hydrogen sulfide-selective adsorbent or absorbent, the improvement which comprises: adding hydrocarbon or carbon dioxide and air to the feed of said Claus process in an amount sufficient to form in the off-gas from said process substantially all of the reducing gas required to effect reduction of sulfur dioxide to hydrogen sulfide in the presence of said metal catalyst.

2. The process of claim 1 wherein the hydrocarbon is added in a gaseous or vapor form.

3. The process of claim 2 wherein the added hydrocarbon has a boiling point below 220° C.

4. The process of claim 2 wherein the hydrocarbon is added in an amount less than 10% by volume, based on the hydrogen sulfide in the feed.

5. The process of claim 4 wherein the off-gas contains a molar ratio of hydrogen and carbon monoxide to sulfur dioxide of from 3:1 to 15:1.

6. The process of claim 5 wherein the added hydrocarbon has a boiling point of from 80° C. to 100° C.

7. The process of claim 5 wherein the metal catalyst employed for reduction is a Group VI/Group VII metal catalyst.

8. The process of claim 7 wherein the off-gas is contacted with a solid catalyst for the conversion of carbonyl sulfide and carbon disulfide into hydrogen sulfide.

9. The process of claim 8 wherein active carbon is employed as the adsorbent to remove hydrogen sulfide from the reduced off-gas.

10. The process of claim 8 wherein an aqueous solution of a polyalkanolamine is employed to remove hydrogen sulfide from the reduced gas.

References Cited

UNITED STATES PATENTS

| 1,916,824 | 7/1933 | Braus | 55—73 |
| 3,752,877 | 8/1973 | Beavon | 423—573 |
| 2,169,379 | 8/1939 | Barkholt | 423—576 |
| 3,317,281 | 5/1967 | Grekel | 423—576 |
| 2,958,586 | 11/1960 | Barber | 423—576 |
| 2,497,095 | 2/1950 | Nevins et al. | 423—573 |

FOREIGN PATENTS

| 708,041 | 4/1954 | Great Britain | 423—573 |

OTHER REFERENCES

Beavon et al., "Prevention of Air Pollution by Sulfur Plants," South. Col. Section Am. Inst. Ch. Engr., Apr. 1971.

GEORGE O. PETERS, Primary Examiner

U.S. Cl. X.R.

423—564, 570